United States Patent
Bottome

(10) Patent No.: US 8,591,172 B2
(45) Date of Patent: Nov. 26, 2013

(54) CONTAINMENT CASING FOR AN AERO ENGINE

(75) Inventor: Kristofer John Bottome, Nottingham (GB)

(73) Assignee: Rolls-Royce PLC (GB)

( * ) Notice: Subject to any disclaimer, the term of this patent is extended or adjusted under 35 U.S.C. 154(b) by 722 days.

(21) Appl. No.: 12/873,650

(22) Filed: Sep. 1, 2010

(65) Prior Publication Data

US 2011/0076132 A1    Mar. 31, 2011

(30) Foreign Application Priority Data

Sep. 25, 2009 (GB) .................................. 0916823.8

(51) Int. Cl.
*F01D 25/24* (2006.01)
(52) U.S. Cl.
USPC ............................... 415/9; 415/126; 415/220
(58) Field of Classification Search
USPC ..................................... 415/9, 126, 128, 220
See application file for complete search history.

(56) References Cited

U.S. PATENT DOCUMENTS

| | | |
|---|---|---|
| 3,948,346 A | 4/1976 | Schindler |
| 4,149,824 A | 4/1979 | Adamson |
| 4,934,899 A * | 6/1990 | Patacca ........................ 415/9 |
| 5,188,505 A | 2/1993 | Schilling et al. |
| 5,205,708 A | 4/1993 | Plemmons et al. |
| 5,267,828 A | 12/1993 | Lenhart et al. |
| 5,431,532 A | 7/1995 | Humke et al. |
| 5,482,429 A | 1/1996 | Penda |
| 5,528,904 A | 6/1996 | Jones et al. |
| 6,149,380 A | 11/2000 | Kuzniar et al. |
| 6,179,551 B1 | 1/2001 | Sathianathan et al. |
| 6,200,091 B1 | 3/2001 | Bromann et al. |
| 6,227,794 B1 | 5/2001 | Wojtyczka et al. |
| 6,508,623 B1 | 1/2003 | Shiozaki et al. |
| 6,575,694 B1 | 6/2003 | Thompson et al. |
| 6,619,913 B2 | 9/2003 | Czachor et al. |

(Continued)

FOREIGN PATENT DOCUMENTS

| | | |
|---|---|---|
| EP | 0626502 A1 | 11/1994 |
| EP | 1084951 A3 | 10/2001 |

(Continued)

*Primary Examiner* — Ninh H Nguyen
(74) *Attorney, Agent, or Firm* — McCormick, Paulding & Huber LLP

(57) ABSTRACT

A containment assembly for a turbo fan engine, has a casing arranged in use around a rotatable fan, to form a duct for the fan and a liner element disposed on an interior surface between the casing and blades of a rotatable fan. The liner element includes a body portion mounted in a recess in the casing and a wall portion arranged to form part of an inner wall of the duct. The wall portion and the body portion being attached and defining a containment cavity therebetween for containment of a detached fan blade fragment in use, wherein the wall portion has a moveable portion movable between a first configuration in which it lies substantially flush with the inner wall of the duct, and a second configuration in which it provides an opening through which a fan blade fragment can enter the containment cavity.

13 Claims, 4 Drawing Sheets

(56) References Cited

U.S. PATENT DOCUMENTS

| | | | |
|---|---|---|---|
| 6,637,186 B1 | 10/2003 | Van Duyn | |
| 8,047,764 B2 * | 11/2011 | Launders | 415/1 |
| 8,202,041 B2 * | 6/2012 | Wojtyczka et al. | 415/119 |
| 8,297,912 B2 * | 10/2012 | Reed | 415/9 |
| 2004/0037694 A1 | 2/2004 | Mather | |
| 2005/0196270 A1 | 9/2005 | Amiot et al. | |
| 2005/0246889 A1 | 11/2005 | Charrier et al. | |
| 2005/0265826 A1 | 12/2005 | Care | |
| 2008/0226444 A1 | 9/2008 | Humphries | |
| 2008/0253883 A1 | 10/2008 | Pool et al. | |
| 2009/0214327 A1 | 8/2009 | Evans | |

FOREIGN PATENT DOCUMENTS

| | | |
|---|---|---|
| EP | 1336739 A3 | 3/2005 |
| EP | 1566523 A2 | 8/2005 |
| EP | 1589195 A1 | 10/2005 |
| EP | 2116695 A2 | 11/2009 |
| GB | 2288639 A | 10/1995 |
| GB | 2365926 A | 2/2002 |
| GB | 2407344 A | 4/2005 |
| GB | 2416192 A | 1/2006 |
| GB | 2422407 A | 7/2006 |
| GB | 2426287 A | 11/2006 |

* cited by examiner

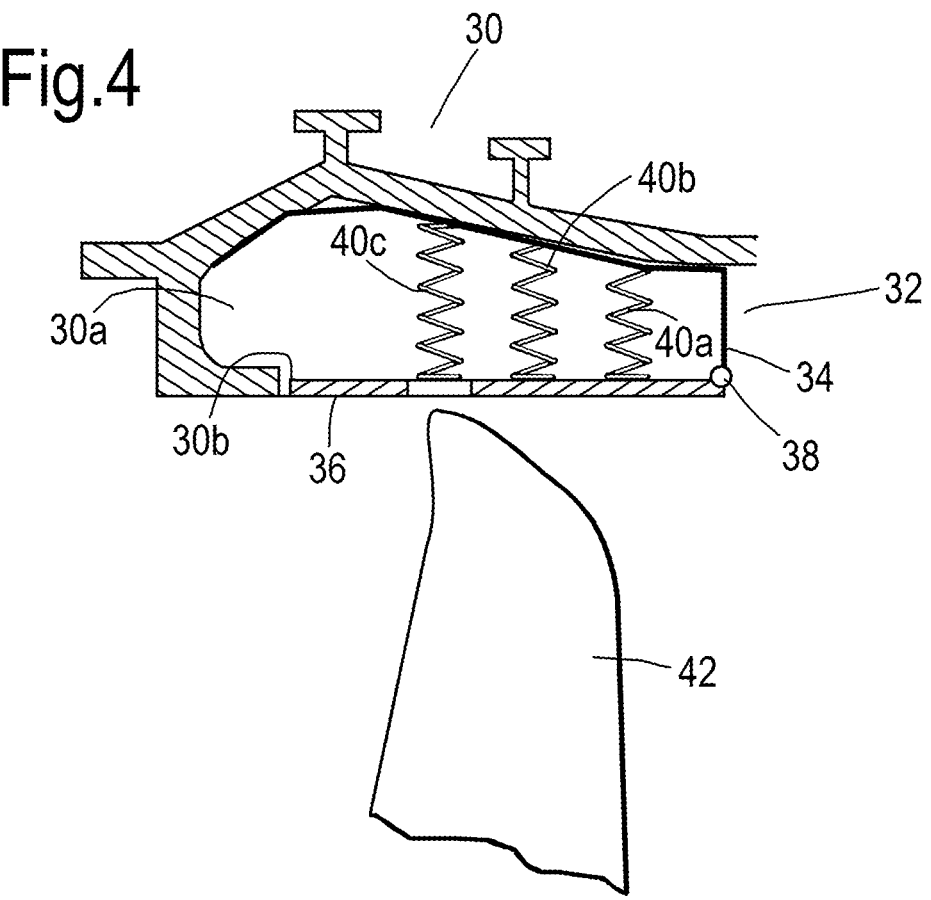
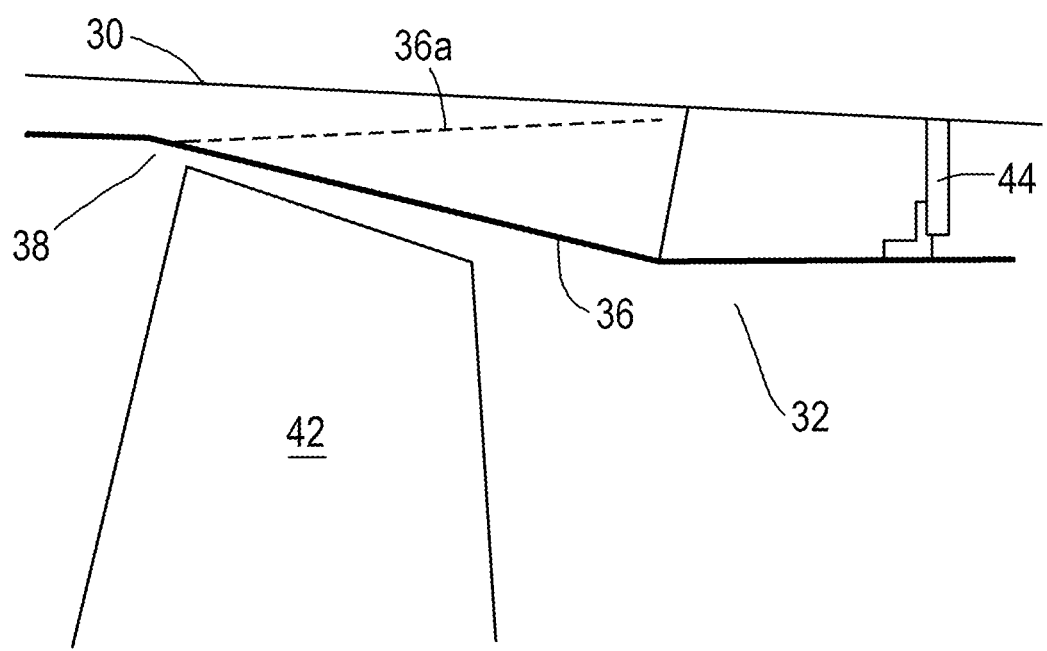

CONTAINMENT CASING FOR AN AERO ENGINE

CROSS REFERENCE TO RELATED APPLICATION

This application is entitled to the benefit of British Patent Application No. GB 0916823.8, filed on Sep. 25, 2009.

FIELD OF THE INVENTION

The present invention relates to a containment casing for an aero engine. In a ducted fan, such as is commonly used in an aero engine for example, a fan is disposed co-axially in a duct and is driven to rotate within the duct to direct air rearwardly through the duct.

BACKGROUND OF THE INVENTION

Turning to FIG. 1, this shows schematically generally at 10, a previously considered turbofan aero engine comprising a core 12 which provides drive to a rotary fan 14 having a plurality of circumferentially spaced fan blades 16 thereabout. A nacelle 18 surrounds the core 12 and is mounted thereon by struts 20. The nacelle has an inlet 22 and an exhaust nozzle 24 and forms a duct casing around the fan 14. In use, air is drawn in via the inlet 22 and compressed by the fan 14. Some of the compressed air is fed into the core 12 which includes further compressor stages, a combustor and a turbine which drives the fan 14 (none of which are shown in this diagram). The rest of the air, so called bypass air, is directed around the core to the exhaust nozzle. Thrust is provided by both the exhaust from the core and the bypass air from the fan.

Although very rare, a fan-blade-off (FBO) event can occur, for example due to a foreign body, such as a bird, striking a fan blade and resulting in at least part of the fan blade becoming detached. Accordingly, the casing around the fan is typically provided with a containment structure designed to capture and retain the detached fragment of the fan blade, thereby preventing it from causing damage to any other part of the aircraft.

The containment structure may for example consist of a plain or ribbed metallic casing, or a plain or isogrid Kevlar®-wrapped casing. The weight of the fan case assembly can account for between 5 and 10% of the engine weight due at least partially to the presence of such containment structures.

In order to absorb that the high energies experienced in an FBO event, the casing materials are selected for high strength and high ductility. This requires the casing to be carefully designed using materials such as aluminium with Kevlar wrapping, ribbed Armco® or ribbed titanium alloy, to withstand the high forces generated when a fan blade is released.

Early containment systems incorporated a steel band wrapped around the casing in the plane of the rotating fan blade. However, to reduce weight, a Kevlar-wrapped aluminium fan case was introduced. During an FBO event, the Kevlar can absorb the blade energy by deflecting and stretching and thus diverting the load around the casing. Any accessories bolted onto the outside of the fan case must be positioned outside of the so-called "Kevlar keep out zone", to ensure that there is no contact with the Kevlar "wave" and therefore that the accessories remain attached to the fan case following the failure of a fan blade.

For efficiency and stability of the fan blades the gaps between the tips of the blades and the inner surface of the fan case must be kept to a minimum so as to minimise leakage of air around the tips of the blade.

However, with smaller clearances between the blade tips and the duct casing comes the likelihood that some rubbing between the two will take place in certain operating conditions. For example, when the speed of rotation of the fan increases the blades can elongate due to centrifugal forces. Also during certain manoeuvres of the aircraft gyroscopic effects may temporarily cause the fan and the duct to come out of perfect axial alignment, which can lead to rubbing of the blade tips against the interior of the fan case.

To accommodate this rubbing, the case is provided with a lining comprising a sacrificial abradable layer which is designed to be cut or rubbed away by the blade tips. The liner is sometimes referred to as a fan track liner (FTL).

The majority of current methods of fan blade containment rely upon penetration of the fan track liner by the detached blade fragment. This mechanism is suitable for stiff, high energy debris with high pressure energies—i.e. it is suited to FBO events where the fan blade is of a conventional, widely used design and material. However, if the fan blade design is different from the conventional one, for example if the fan blade is made of a composite material or else has a wider tip than is conventional, then the previous approach to containment may be unsuitable and could potentially allow the blade to be uncontained. One reason that this may happen is that an increased area of the blade tip, for example, may significantly reduce the pressure energy available for the blade to penetrate the fan track liner.

Also, with the ever present design imperative to reduce weight in the engine, lighter fan blades are being adopted which have less mass. Therefore less energy is available to penetrate the fan track liner in an FBO event. Again this could cause the blade to skid over the liner and remain uncontained.

Furthermore, due to the increasing use of swept blades there are correspondingly increasing requirements to accommodate the shedding of ice. The impact area for any ice which is shed by a swept fan blade could be in the same location as the area where a blade fragment would impact during an FBO event. The pressure energies are similar in magnitude which may mean that a design which allows the blade to penetrate the FTL may not pass the ice shedding/impact regulation requirements, and conversely a liner which is designed to withstand ice impact may not allow the blade to penetrate the FTL and then be contained.

In the case of the latter the fan case would fail a containment test and in the case of the former a significant additional after-market burden would be added both in terms of time and cost.

An additional problem with previously considered designs is that in systems using Kevlar, the performance of the Kevlar degrades over time as it absorbs water, so any system using a Kevlar wrap as the containment structure gradually becomes less effective.

SUMMARY OF THE INVENTION

Accordingly, the present invention aims to provide a containment structure for an aero engine, in which at least some of the aforementioned problems are addressed.

The present invention is defined in the attached independent claims to which reference should now be made. Further preferred features may be found in the dependent claims appended thereto.

According to the invention there is provided a containment assembly for a turbo fan engine, having a casing arranged in use around a rotatable fan to form a duct for the fan, the containment assembly comprising at least one liner element disposed on an interior surface between the casing and blades of a rotatable fan, the liner element including a body portion mounted in a recess in the casing and a wall portion arranged to form part of an inner wall of the duct, the wall portion and the body portion being attached and defining a containment cavity therebetween for containment of a detached fan blade fragment in use, wherein the wall portion comprises a moveable portion which is movable between a first configuration in which it lies substantially flush with the inner wall of the duct, and a second configuration in which it provides an opening through which a fan blade fragment can enter the containment cavity.

The movable portion is preferably mounted pivotally on the body portion.

Preferably the movable portion is mounted hingedly on the body portion.

In a preferred arrangement the movable portion is mounted resiliently on the body portion of the liner element.

Preferably at least one spring is arranged to bias the movable portion in the first configuration.

The containment cavity may contain shock absorbing-means.

The liner element may have at least one deflector portion arranged in use to deflect a fan blade fragment rearwardly.

Preferably the liner element includes at least one containment feature arranged to limit rearward movement of a fan blade fragment.

The wall portion preferably has an abradable material.

The wall portion may be of a honeycomb material.

The casing and/or the moveable portion may have a sealing member arranged to provide a seal for a gap therebetween.

The sealing member may be arranged to break the seal once a threshold force on the moveable member is exceeded.

BRIEF DESCRIPTION OF THE DRAWINGS

FIG. 4 shows schematically a second embodiment of fan case structure according to the invention;

FIG. 5 shows schematically a third embodiment of fan case containment structure according to the invention;

DETAILED DESCRIPTION OF THE PREFERRED EMBODIMENTS

Figure 1:
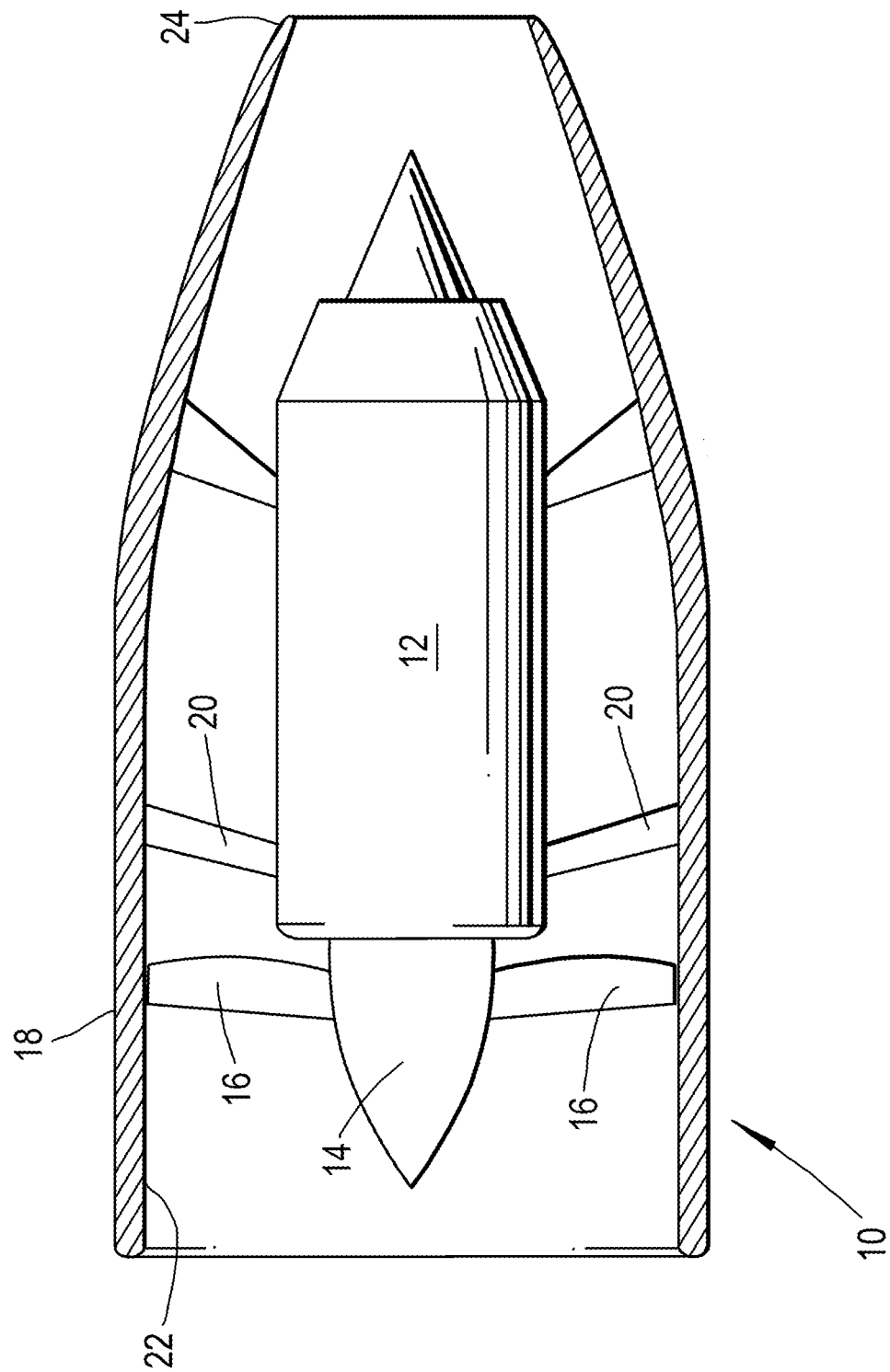
FIG. 1 is a schematic view of a turbo fan engine.
Figure 2:
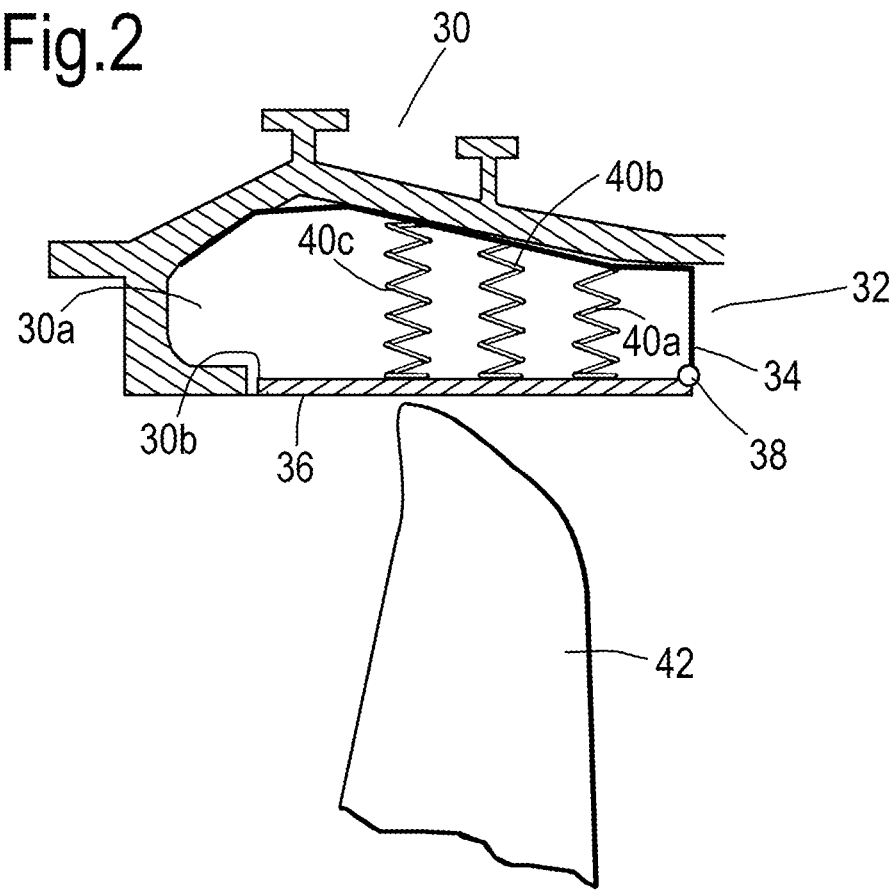
FIG. 2 is a schematic sectional view of a fan case containment structure according to a first embodiment of the invention.

Turning to FIG. 2, this shows generally at 30 a part of a fan case of a turbo fan engine. On the interior surface of the fan case 30 is mounted a fan track liner element 32 comprising a stiff body portion, or carcass, 34 and a movable wall portion 36 which is pivotably mounted on the carcass 34 by a hinge 38.

The movable portion 36 is further connected to the carcass by biasing springs 40a, 40b and 40c. As an alternative to the springs a resilient foam or honeycomb could be used. The fan track liner element 32 is one of a plurality of such liner elements arranged circumferentially around the interior of the fan case 30.

Rotating below the fan track liner in use are the blades of the fan, one of which shown at 42.

The fan case 30 is constructed in accordance with a previously known design using an Armco® style casing. The key difference between the present invention and previous case containment structures is in the fan track liners 32. With previously considered designs the fan track liners are bonded in the fancase and designed for the blade to penetrate them in a fan blade off (FBO) event. In accordance with the present invention the fan track liners are constructed with a movable portion 36 (or multiple portions) that are designed to be pushed outwards by the blade fragment rather than being penetrated.

The fan track liner includes several of the elements 32 each having an independently movable portion 36. With a convergent or divergent fan case, for aerodynamic purposes, each element 32 is frusto-conical in shape. If a cylindrical fan case is utilised the elements 32 would comprise sections of a cylinder.

The moveable portion has an abradable layer and a rigid backing plate which is hingedly attached at one edge to the body and therefore allowed to pivot with respect to the body. The abradable surface is similar to those used in conventional fan track liners and is typically constructed of honeycomb material such as Nomex® which is optimised for ice resistance and blade tip sealing, and which can work effectively as a tip rub for the fan blades.

The backing plate material can be metallic such as titanium alloy or stainless steel alloy for hardness. A composite material could be used as the backing plate. However, it must have sufficient hardness that a detached blade fragment will not damage it.

The backing plate can be attached to a soft spring or further honeycomb filling (not shown) so that the blade fragment pushes the movable section of the liner without distorting the liner surface, but in any case the movable portion 36 must be stiffer than the springs 40 in order to resist radial deflection of the movable portion 36.

The approach employed in the present invention utilises the fact that in an FBO event the fan blade fragment leading edge contacts the liner first, at a distance from the pivot. The energy from the fan blade fragment is sufficient to push the liner outwards and compress the springs 40 or honeycomb backing material behind the rigid backing plate.

Figure 3:
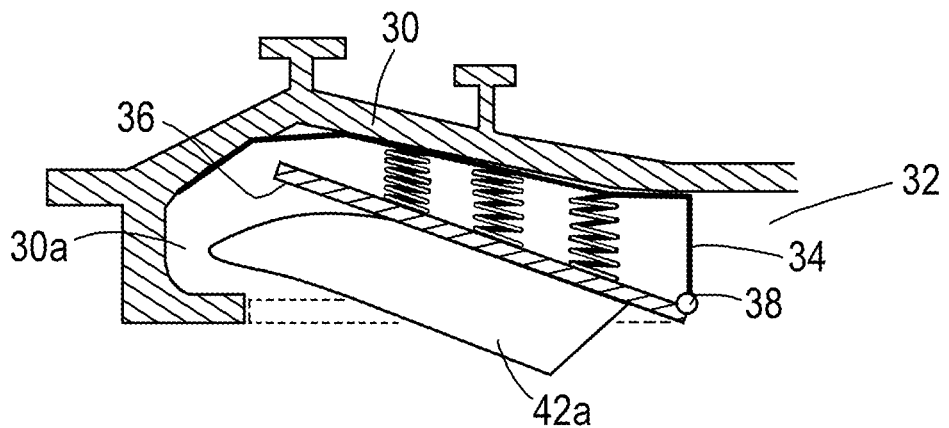
FIG. 3 is a further schematic view of the structure of FIG. 2 in an alternative configuration.

FIG. 3 shows the movable portion 36 pivotally displaced by a fragment 42a of the fan blade.

Deflection of the movable portion 36 absorbs a small amount of the blade energy. As the blade fragment pushes the movable portion upwards it slides up the surface into a gap created by the movement of the movable portion. The rotating motion of the blade then causes it to move circumferentially around the fan case into a cavity in between the moveable portion of the adjacent FTL element and the fan case—i.e. into the space behind the movable portion of the circumferentially adjacent liner element 32. This space can be filed with shock-absorbing compressible material which absorbs more energy from the blade fragment. The motion can also be assisted by the impact of the trailing edge of the blade fragment. At the front the blade fragment is retained in a recess 30a, known as the fan case "hook" and at the rear by a mounting ring (not shown) for the fan track liner.

FIG. 4 shows another embodiment of containment structure. In this embodiment the movable portion 36 has been chosen to be softer, and the springs 40 less resilient. This is to accommodate an ice shedding event. For ice shedding, the ice impact will take place much closer to the pivot. This means that to achieve the same moment as would be achieved by the displaced fan blade fragment the force required to deform or compress the honeycomb would be much greater due to the distance from the pivot being smaller. Using this principle, the honeycomb or spring can be made soft enough to resist the ice impact but still be able to deform upon contact by the blade fragment. Thus the abradable liner system will absorb ice impacts without damage, as the energy from the ice will not be sufficiently great to deflect the movable portion 36.

There is a small gap 30b between the edge of the movable portion 36 furthest from the hinge 38 and the wall of the casing 30. This gap may be filled or sealed using a sealing member (not shown) in order to avoid creating an aerodynamic disjoint. Filling of this gap also allows that the deflection of the movable portion 36 will not occur until sufficient force has been applied in order to break the seal. This approach can prevent the moveable member 36 from oscillating against the springs 40 during normal use, or inadvertently deploying under extreme manoeuvres or heavy landing, for example.

Turning to FIG. 5, this shows in somewhat schematic form a further embodiment of containment structure. In this case the hinge 38 is at a forward, or upstream, location. The broken line 36a depicts the movable portion 36 as it would be displaced in the event of an impact by a fan blade fragment. An annular, downstream or "backstop" retention element in the form of a containment wall 44 is provided to resist rearward motion of the blade fragment. In this example the attachment of the movable portion 36 is opposite to that of the previous embodiment. Again the liner 32 is divided into segments, for example twelve circumferentially adjacent segments around the fan case, each of which has an independently movable portion 36. The mechanism of containment is the same as with the previous embodiment, namely that the leading edge of the fan blade fragment pushes upwards against the movable portion 36 to deflect it in order to create a slot into which the fan blade fragment may travel.

Figure 6:
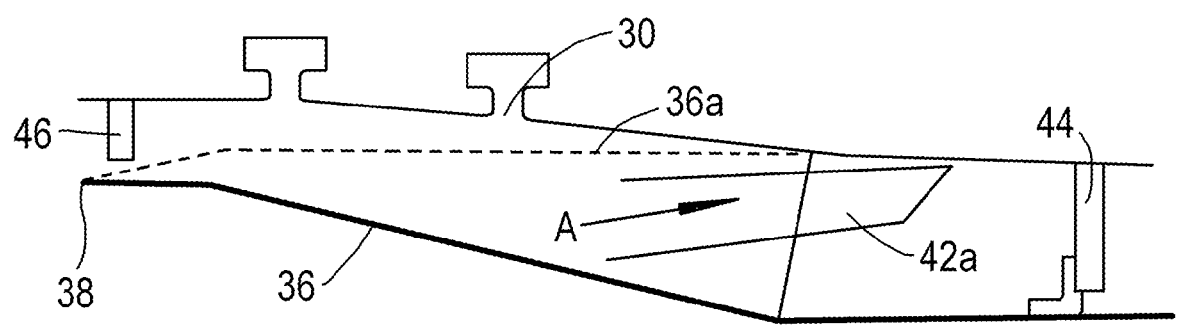
FIG. 6 shows schematically a fourth embodiment of fan case containment structure according to the invention.

FIG. 6 shows an alternative embodiment of containment structure with similar elements being labelled with like reference numerals as in previous embodiments. Description of these elements is omitted here. In this embodiment, an annular wall 46 is built into the fan case to aid deflection of the fan blade fragment rearwards in the direction shown by arrow A.

Figure 7:
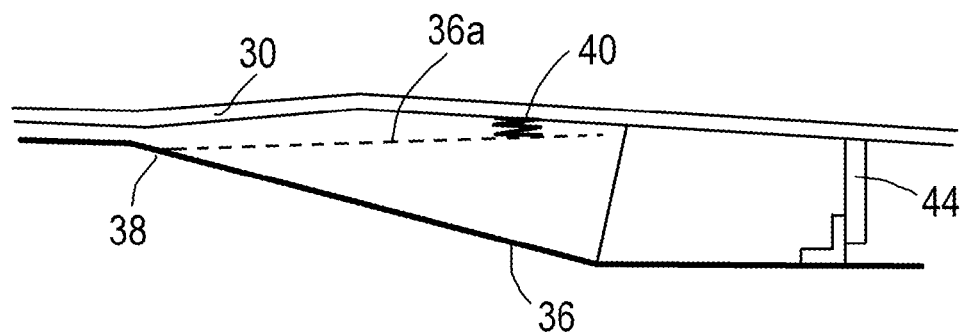
FIG. 7 shows schematically a fifth embodiment of fan case containment structure according to the present invention.

FIG. 7 shows a further variation. Again, like reference numerals are used for like elements with description of these elements being omitted here. In FIG. 7 the position of the hinge 38 is further downstream as compared with the embodiment of FIG. 6. A compressible spring 40 holds the moveable portion 36 in position during normal operation.

The containment structures according to the present invention provide a number of advantages compared with previous approaches. Since the majority of previously considered fan blade containment methods involved penetrating a hard lining material, such previously considered systems are unsuitable when fan blades other than conventional metallic fan blades with conventional shapes are used. With the present invention there is no need to physically penetrate a liner. Rather, the liner is effectively displaced temporarily by a blade fragment in order to create a space for the fragment to move into and thereafter be contained. Accordingly, the approach used in the present invention is suitable for use with any type of fan blade.

Furthermore, the performance of the system is not prone to degradation over time, as is the case with previously considered Kevlar systems.

Finally, the geometry employed by the present invention is more reliable at containing blade fragments since there is no risk that the fan blade fragment will fail to be engaged by the hook in the fan case, as would be the case if the fragment were to fail to penetrate a hard lining material in a previously considered containment system.

In the space between the movable element 36 and the carcass 34 can be a soft honeycomb material which can permanently deform to allow a fan blade fragment to be retained. This material could be a Nomex®-based phenolic honeycomb or an aluminium honeycomb. A foam material could also be utilised. The springs 40 can be of composite material or of metal. An additional feature could be that the gap 30b between the movable portion 38 and the fan case 30 could be filled with a honeycomb oriented at 90° to that of the rest of the honeycomb material. In this case the strength of the honeycomb would be aligned with the motion of the blade and this could provide a degree of spring in a radial direction, to absorb the energy of ice impacts which allowing the profile of the fan track liner to be unaffected. However it would still provide a large amount of resistance to the fan blade fragment once it had pushed the liner outwards and moved into the void between the movable portion 36 and the fan case 30.

The springs 40 could equally be replaced by bellows which could form acoustic cavities. The cavities could also act as part of the containment system for a blade fragment entering the case through an adjoining or adjacent moveable portion.

What is claimed is:

1. A containment assembly for a turbo fan engine, having a rotatable fan comprising:
    a casing arranged in use around the rotatable fan to form a duct for the fan,
    at least one liner element disposed on a duct interior surface between the casing and the rotatable fan blades,
    the liner element having
        a body portion mounted in a recess in the casing and
        a wall portion arranged to form part of an inner wall of the duct,
    the wall portion and the body portion being attached and defining a containment cavity therebetween for containment of a detached fan blade fragment in use,
    wherein the wall portion includes a moveable portion which is movable between a first configuration in which it lies substantially flush with the inner wall of the duct, and a second configuration in which it provides an opening through which a fan blade fragment can enter the containment cavity.

2. A containment assembly according to claim 1 wherein the movable portion is mounted pivotally on the body portion.

3. A containment assembly according to claim 1 wherein the movable portion is mounted hingedly on the body portion.

4. A containment assembly according to claim 1 wherein the movable portion is mounted resiliently on the body portion of the liner element.

5. A containment assembly according to claim 4 wherein at least one spring is arranged to bias the movable portion to the first configuration.

6. A containment assembly according to claim 1 wherein the containment cavity further comprises shock absorbing means.

7. A containment assembly according to claim 1 wherein the liner element further comprises at least one deflector portion arranged in use to deflect a fan blade fragment rearwardly.

8. A containment assembly according to claim 1 wherein the liner element further comprises at least one containment feature arranged to limit rearward movement of a fan blade fragment.

9. A containment assembly according to claim 1 wherein the wall portion further comprises an abradable material.

10. A containment assembly according to claim 9 wherein the wall portion further comprises a honeycomb material.

11. A containment assembly according to claim 1 wherein the casing and/or the moveable portion further comprises a sealing member arranged to provide a seal for a gap therebetween.

12. A containment assembly according to claim 11 wherein the sealing member is arranged to break the seal once a threshold force on the moveable member is exceeded.

13. An aero engine comprising:
   a core,
   a rotary fan driven by the core having a plurality of circumferentially spaced fan blades thereabout,
   a nacelle surrounding the core and is mounted thereon by struts, the nacelle having an inlet and an exhaust nozzle,
   a duct casing formed around the fan, and
   a containment assembly including at least one liner element disposed on an interior surface between the casing and blades of a rotatable fan, the liner element having a body portion mounted in a recess in the casing and a wall portion arranged to form part of an inner wall of the duct, the wall portion and the body portion being attached and defining a containment cavity therebetween for containment of a detached fan blade fragment in use,
   wherein the wall portion includes a moveable portion which is movable between a first configuration in which it lies substantially flush with the inner wall of the duct, and a second configuration in which it provides an opening through which a fan blade fragment can enter the containment cavity.

\* \* \* \* \*